United States Patent [19]
Steger

[11] 3,961,394
[45] June 8, 1976

[54] CONNECTING CLIP

[75] Inventor: Werner Thomas Steger, Mississauga, Canada

[73] Assignee: Tridon Limited, Burlington, Canada

[22] Filed: May 28, 1975

[21] Appl. No.: 581,665

[52] U.S. Cl. ............................................ 15/250.32
[51] Int. Cl.² .......................................... B60S 1/40
[58] Field of Search ................... 15/250.32–250.42

[56] References Cited
UNITED STATES PATENTS

| 2,643,410 | 6/1953 | Nesson | 15/250.32 |
| 2,643,411 | 6/1953 | Nesson | 15/250.32 |
| 3,824,648 | 7/1974 | Van Den Berg et al. | 15/250.32 |

FOREIGN PATENTS OR APPLICATIONS

| 1,084,154 | 6/1960 | Germany | 15/250.32 |

*Primary Examiner*—Peter Feldman

[57] ABSTRACT

A connecting clip for use in connecting a windshield wiper arm to the superstructure of a windshield wiper assembly has a main body which includes means for securing the clip to the superstructure of a windshield wiper assembly and an end portion in which a pair of axially extended recesses are formed with a wall portion separating the recesses. These recesses have different cross sectional areas for receiving wiper arms of different sizes, with the separating wall between the recesses having an opening therein formed for receiving a locking button on a windshield wiper arm.

11 Claims, 4 Drawing Figures

U.S. Patent June 8, 1976 3,961,394
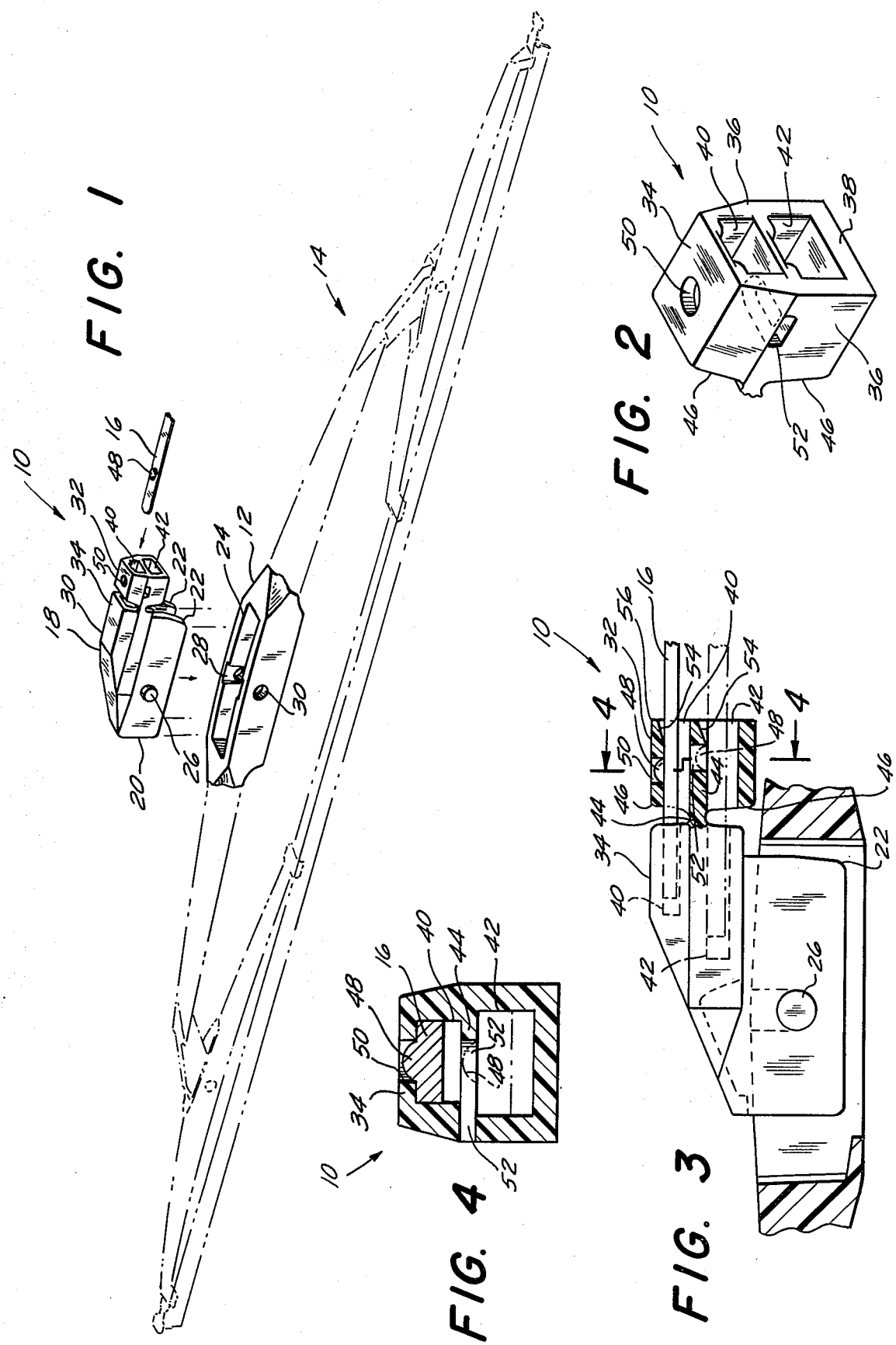

CONNECTING CLIP

The present invention relates to windshield wiper connecting clips, and more particularly, to a connecting clip which is adapted to be used with windshield wiper arms of different sizes.

Connecting clips which are presently used to secure a windshield wiper assembly superstructure to the wiper arm of a vehicle's windshield wiper arrangement, are designed to be used only with one type or size of windshield wiper arm. Although this may be satisfactory for the original equipment market, in the replacement market it is desirable that the connecting clips have greater flexibility of use.

A typical type of windshield wiper arm is the so-called bayonet type which is substantially straight at its end, and includes a locking button or protuberance on one side thereof which snaps into an opening in the connecting clip. Such bayonet type windshield wiper arms are formed in a variety of sizes, depending upon the manufacturer, but in general there are two main standardized sizes for such arms. With previously proposed connecting clip structures, a clip designed for use with the smaller bayonet type arm could not be used to connect a windshield wiper assembly to the larger type wiper arm and vice versa. Accordingly, it is necessary for clip manufacturers to supply dealers and outlet stores with two different types of connecting clips. This not only increases the clip manufacturer's costs but requires a greater inventory for the dealer or retail store itself.

Accordingly, it is an object of the present invention to provide a connecting clip for windshield wiper assemblies that can be used with a plurality of different types or sizes of wiper arms.

Another object of the present invention is to provide a windshield wiper connecting clip that can be used with different sized wiper arms, and yet which is relatively inexpensive to manufacture and durable in construction.

A further object of the present invention is to provide a connecting clip which is fairly easy to connect and remove from a windshield wiper arm.

In accordance with an aspect of the present invention a connecting clip for use in connecting a windshield wiper arm to the superstructure of a windshield assembly is provided which includes a main body portion and an extension portion having means for securing the clip to a wiper assembly superstructure. The main body portion has a pair of vertically spaced axially elongated recesses formed therein and a top wall forming one side of the uppermost of the recesses. The cross sectional area of one of the recesses is larger than the cross sectional area of the other recess, so that the recesses can respectively receive wiper arms of different sizes. A separating wall is located between the recesses and both the top and separating wall of the clip have openings formed therein for engaging a locking button on the wiper arm inserted in the recess, thereby to prevent undesired longitudinal movement of the arm with respect to the clip.

The above, and other objects, features and advantages of the present invention will be apparent in the following detailed description of an illustrative embodiment thereof, which is to be read in conjunction with the accompanying drawings wherein:

FIG. 1 is a perspective view of a connecting clip formed in accordance with the present invention, showing the clip in association with a wiper arm and windshield wiper superstructure;

FIG. 2 is an enlarged perspective view of the end portion of the clip to which the wiper arm is secured;

FIG. 3 is an elevational view, partly in section, of the connecting clip shown in FIG. 1; and FIG. 4 is a sectional view taken along line 4—4 in FIG. 3.

Referring now to the drawing in detail, and initially to FIG. 1 thereof, it will be seen that a connecting clip 10, constructed in accordance with the present invention is adapted to be secured to the superstructure 12 of a windshield wiper assembly 14, while simultaneously being connected to the bayonet type arm 16 of a vehicle's windshield wiper device.

Connecting clip 10 has a main body portion 18 and an extension portion 20, which operates to connect the main body portion to the superstructure 12. Extension 20 consists of a pair of spaced flanged members 22 which are dimensioned to be received within the generally rectangular opening 24 in superstructure 12. Each of the extension members 22 has a locking button 26 formed thereon which, during the insertion operation into the superstructure assembly, are guided by ramp sections 28, in the superstructure 12, into locking engagement with openings 30. Since the entire clip structure is formed of a molded plastic material, the extensions 22 are slightly resilient and thus are readily inserted within the opening 24.

Connecting clip 10 is adapted to secure the windshield wiper assembly 14 to wiper arms 16 of different sizes. To this end, the main body portion 18 is formed in two sections 30, 32. Each section has a top wall 34, a pair of generally perpendicularly extending side walls 36, and a bottom wall 38. These walls define a pair of vertically arranged spaced recesses 40, 42, which extend through the first section 32 to the second section 34 of the clip. A separating wall 44 extends along the clip to segregate these recesses. This separating wall forms the connection between the two sections of the clip, since the top, bottom and side walls of the clip are notched, as at 46 (see FIG. 3) to allow the section 32 to flex with respect to the section 30, as described hereinafter.

The elongated or extended recesses 40, 42 have different cross sectional areas, as seen in FIG. 4. Preferably the upper recess 40 has a smaller cross sectional area than the recess 42, with the cross sectional areas being generally rectangular for the purpose of accepting the generally rectangular wiper arm 16. In this manner the upper recess 40 can receive the typical small dimension wiper arm while the lower recess 42 can receive the standard larger dimension wiper arm provided on certain types of vehicles. These wiper arms are typically provided with locking buttons 48 formed on their upper surfaces for cooperation with the connecting clip to prevent undesired longitudinal movement of the clip and wiper arm during use. Accordingly the top wall 34 of the clip 10 is provided with a recess 50 which is adapted to receive the locking button of the wiper arm for this purpose.

The separating wall 44, between recesses 40 and 42, is also provided with a locking opening, 52, which is adapted to receive the locking button 48 of a wiper arm inserted therein. This locking opening is formed in the molding process by a bayonet type movable mold element, inserted into the mold cavity through the portion of the mold which forms one of the side walls 36 of the clip section 32. After the plastic of the clip has solidified, the mold element is retracted, and leaves the opening 52. As seen in FIG. 2, this opening extends from an intermediate portion of the separating wall 44 towards one of the side walls 36 and extends therethrough. Although the opening is elongated in this manner, it cooperates with the locking button 48 to prevent longitudinal movement of the wiper arm. Lateral movement of the arm of course is restrained by the confining side walls of the recesses.

In order to facilitate insertion of the wiper arm into the recesses 40, 42 the lower surfaces of the top wall 32 and the intermediate wall 44 are formed with inclined ramp sections 54 which taper from the free end 56 of clip section 32 towards the openings 50, 52. Accordingly, upon insertion of a wiper arm into one of the recesses 40, 42, its locking button 48 will engage the ramps or cam surfaces 54 and be guided to the associated clip opening. The engagement of the ramp and locking button will cause relative flexing between the clip section 32 and the wiper arm, and possibly flexing of the clip section 32 with respect to the clip section 34. For this purpose, the notches 46 are provided in the clip, with only the separating wall 44 connecting the clip sections 32, 34, in order to allow such flexing to take place. It is noted that because the upper recess 40 accommodates a smaller wiper arm than the lower recess 42, its ramp 54 is inclined to a lesser extent than the ramp for recess 42.

Additionally it is noted that in the preferred embodiment of the invention, the height of the recesses 40, 42, in the clip section 34 is smaller than the height of the recesses in clip section 32 (see FIG. 3). This difference in height, and thus cross sectional area, facilitates the flexing movement of section 32 with respect to section 34 and the wiper arm 16. This in turn facilitates the insertion—and the removal—of the wiper arm from the connecting clip.

Accordingly, it is seen that a relatively simple one piece connecting clip is provided which is adapted to be used with wiper arms of different sizes. As a result, the manufacturer need only make one style of connecting clip or bayonet arms and the retailer can reduce his inventory by using only a single stock clip. Moreover this clip is relatively easy and inexpensive to manufacture by a simple molding process; and yet it is able to form a positive and secure connection between both the wiper arm and the superstructure of the wiper assembly.

Although an illustrative embodiment of the present invention has been described herein with reference to the accompanying drawing, it is to be understood that various changes and modifications can be effected therein by those skilled in the art without departing from the scope or spirit of this invention.

What is claimed is:

1. A connecting clip for use in connecting a windshield wiper arm to the superstructure of a windshield wiper assembly, said clip comprising a clip body having a first end portion including means for connecting the clip body to a windshield wiper superstructure and a second end portion adapted to operatively engage a windshield wiper arm, said second end portion having a pair of axially extended recesses formed therein and a wall portion separating the recesses, said recesses having different cross sectional areas for receiving wiper arms of different sizes, and said wall having an opening formed therein for receiving a locking button on the wiper arm.

2. A connecting clip for use in connecting a windshield wiper arm to the superstructure of a windshield wiper assembly, said clip comprising a main body portion and an extension portion including means for securing the clip to a wiper assembly superstructure, said main body portion having a pair of vertically spaced axially elongated recesses formed therein and a top wall forming one side of the upper one of said recesses; the cross sectional area of one of said recesses being larger than the cross sectional area of the other recess whereby said recesses can respectively receive wiper arms of different sizes; a separating wall located between said recesses; said top wall and said separating wall each having openings formed therein for receiving and engaging a locking button on the wiper arm to prevent undesired longitudinal movement of the arm with respect to the clip.

3. The clip as defined in claim 2 wherein said separating wall is located in spaced parallel relation to said top wall.

4. The clip as defined in claim 3 wherein said main body portion includes a pair of side walls extending from said top wall, and said separating wall extends between said side walls; the opening in said separating wall extending from an intermediate portion of the separating wall towards and through one of said side walls to form a continuous opening from said side wall along the separating wall to said intermediate portion thereof.

5. The clip as defined in claim 3 wherein said top wall and separating wall have surface portions facing their associated recess therebelow, and said surface portions have inclined ramp sections formed therein tapering from an adjacent end of the main body portion at the respective recesses towards the openings in said top and separating walls to guide the locking buttons of the wiper arms into the openings.

6. The clip as defined in claim 3 wherein said main body portion includes side walls and a bottom wall; said top, bottom and side walls having a substantially continuous notch formed therein on the upper and lower sides of the main body portion to divide the main body portion into first and second sections connected principally by said separating wall, said first section having the openings in said top and separating walls formed therein and said separating wall at said notch permitting said first section to flex with respect to said second section to facilitate removal of a wiper arm from the clip.

7. The clip as defined in claim 6 wherein said axially extended recesses extend from said first section of the main body portion into the second section thereof, said recesses having a greater cross sectional area in said first section than in said second section to permit flexing of said first section with respect to a wiper arm in the recess to allow removal of the arm from the clip.

8. A connecting clip for use in connecting a windshield wiper arm to the superstructure of a windshield wiper assembly, said clip comprising a main body portion and an extension portion including means for securing the clip to a wiper assembly superstructure, said main body portion having a first and second section and a pair of vertically spaced axially elongated recesses formed therein extending from one end thereof through said first section and into said second section, a separating wall extending between said recesses and a pair of notches formed in said main body portion between said first and second sections whereby said sections are connected primarily by said separating wall; said main body portion including a top wall forming one side of the upper one of said recesses and extending parallel to said separating wall and the cross sectional area of one of said recesses being larger than the cross sectional area of the other recess whereby said recesses can respectively receive wiper arms of different sizes; said top and separating walls each having openings formed therein for receiving and engaging a locking button on the wiper arm to prevent undesired longitudinal movement of the arm with respect to the clip; said notches being said main body sections permitting said first section to flex with respect to said second section and the wiper arm to facilitate insertion and removal of wiper arms from said recesses.

9. The clip as defined in claim 3 wherein said first section of the main body portion includes a pair of side walls extending from said top wall, and said separating wall extends between said side walls; the opening in said separating wall extending from an intermediate portion of the separating wall towards and through one of said side walls to form a continuous opening from said side wall along the separating wall to said intermediate portion thereof.

10. The clip as defined in claim 9 wherein said top wall and separating wall have surface portions facing their associated recess therebelow, and said surface portions have inclined ramp sections formed therein tapering from an adjacent end of the main body portion at the respective recesses towards the openings in said top and separating walls to guide the locking buttons of the wiper arms into the openings.

11. The clip as defined in claim 10 wherein said recesses have a greater cross sectional area in said first section than in said second section to permit flexing of said first section with respect to a wiper arm in the recess to allow removal of the arm from the clip.

* * * * *